(12) United States Patent
Blaxill et al.

(10) Patent No.: US 10,458,311 B2
(45) Date of Patent: Oct. 29, 2019

(54) INTERNAL COMBUSTION ENGINE

(71) Applicant: MAHLE Powertrain LLC, Farmington Hills, MI (US)

(72) Inventors: Hugh Blaxill, Novi, MI (US); Michael Bunce, Plymouth, MI (US)

(73) Assignee: MAHLE Powertrain LLC, Farmington Hills, MI (US)

( * ) Notice: Subject to any disclaimer, the term of this patent is extended or adjusted under 35 U.S.C. 154(b) by 0 days.

(21) Appl. No.: 15/437,884

(22) Filed: Feb. 21, 2017

(65) Prior Publication Data

US 2017/0314456 A1 Nov. 2, 2017

(30) Foreign Application Priority Data

Apr. 28, 2016 (EP) .................................... 16000958

(51) Int. Cl.
| | | |
|---|---|---|
| *F02B 19/10* | (2006.01) | |
| *F02B 19/18* | (2006.01) | |
| *F02D 41/30* | (2006.01) | |
| *F02B 19/12* | (2006.01) | |
| *F02M 57/06* | (2006.01) | |
| *F02P 13/00* | (2006.01) | |
| *F02P 15/08* | (2006.01) | |
| *F02P 15/10* | (2006.01) | |

(52) U.S. Cl.
CPC ...... *F02B 19/1085* (2013.01); *F02B 19/1014* (2013.01); *F02B 19/1028* (2013.01); *F02B 19/12* (2013.01); *F02B 19/18* (2013.01); *F02D 41/3094* (2013.01); *F02M 57/06* (2013.01); *F02P 13/00* (2013.01); *F02P 15/08* (2013.01); *F02P 15/10* (2013.01); *Y02T 10/125* (2013.01)

(58) Field of Classification Search
CPC ................ F02B 19/108; F02B 19/1085; F02B 19/1014; F02B 19/12; F02B 19/1028; F02B 19/18; F02D 41/3094; Y02T 10/125; F02M 57/06; F02P 15/08; F02P 13/00; F02P 15/10
See application file for complete search history.

(56) References Cited

U.S. PATENT DOCUMENTS

| | | | |
|---|---|---|---|
| 2012/0103302 A1 | 5/2012 | Attard | |
| 2013/0151119 A1* | 6/2013 | Mariucci | F02D 41/402 701/104 |
| 2014/0261298 A1* | 9/2014 | Sasidharan | F02B 19/18 123/275 |
| 2015/0068489 A1* | 3/2015 | Bunce | F02B 19/1057 123/262 |
| 2017/0138251 A1* | 5/2017 | Watanabe | F02B 19/18 |
| 2017/0167359 A1* | 6/2017 | Maier | F02B 19/18 |

* cited by examiner

*Primary Examiner* — Xiao En Mo
(74) *Attorney, Agent, or Firm* — Mark Terry

(57) ABSTRACT

Internal combustion engine comprising at least one cylinder and a piston supported for repeated reciprocal movement in the cylinder so as to define a combustion chamber of an engine bore diameter A-A, the internal combustion engine further comprising an ignition device arranged in said cylinder having an igniter portion and an fuel injector which are both arranged in a pre-chamber, wherein the pre-chamber comprises a plurality of orifices for providing fluid communication between said pre-chamber and the combustion chamber, and wherein the plurality of orifices are of an overall orifice area so that the ratio between the overall orifice area and the engine bore diameter A-A ranges from 0.01 mm to 0.2 mm.

11 Claims, 4 Drawing Sheets

INTERNAL COMBUSTION ENGINE

CROSS-REFERENCE TO RELATED APPLICATIONS

This patent application claims priority to European patent application number 16000958.5 filed Apr. 28, 2016 titled "Internal Combustion Engine". The subject matter of patent application Ser. No. 16/000,958.5 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

SUMMARY

An internal combustion engine is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an internal combustion engine comprises at least one cylinder and a piston supported for repeated reciprocal movement in the cylinder so as to define a combustion chamber of an engine bore diameter A-A, the internal combustion engine further comprising an ignition device arranged in said cylinder having an igniter portion and an fuel injector which are both arranged in a pre-chamber, wherein the pre-chamber comprises a plurality of orifices for providing fluid communication between said pre-chamber and the combustion chamber, and wherein the plurality of orifices are of an overall orifice area so that the ratio between the overall orifice area and the engine bore diameter A-A ranges from 0.01 mm to 0.2 mm.

DETAILED DESCRIPTION

Figure 1:
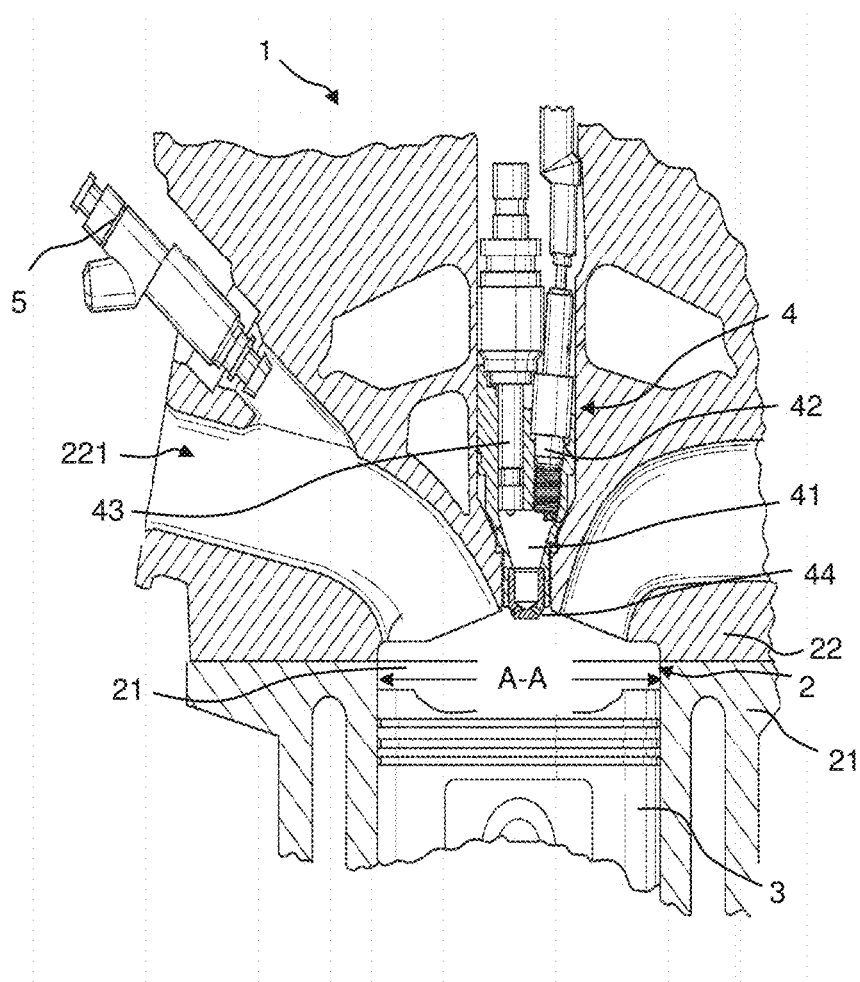
FIG. 1 is a vertical sectional view of an internal combustion engine according to an embodiment of the invention.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The present invention relates to an internal combustion engine according to the independent claim.

The invention refers to the field of internal combustion engines utilizing spark ignition. Lean combustion with $\lambda$ in the approximate range of $1<\lambda<1.5$ has been proven to increase net thermal efficiency compared to combustion with lower $\lambda$, however it also increase NOx emissions so as to necessitate catalytic converters. Ultra-lean combustion with $\lambda>1.5$ has demonstrated the ability to both increase net thermal efficiency and significantly reduce NOx emissions. The major limitation in ultra-lean combustion systems is the poor ignition quality of the mixture which results in a "lean limit" for values of $\lambda$ above which the combustion engine does not ignite.

It is known to handle low ignition qualities of ultra-lean air fuel mixtures in those combustion engines by use of turbulent jet ignition (TJI), a high energy ignition source. An internal combustion engine for TJI comprises an ignition system having at least one pre-chamber with a fuel injector and an ignition device arranged therein. The ignition device is capable of turbulent jet ignition which enables ultra-lean operation by utilizing radical turbulent jets emerging from the pre-chamber to provide the ignition source for the main chamber.

The pre-chamber is small compared to the main chamber volume and has multiple orifices to produce multiple, distributed ignition sites throughout the main chamber. The orifices are of a small size to allow for flame quenching as the combustion products exit out of the pre-chamber into the main combustion chamber. The combustion products then react with the main fuel charge and initiate combustion in the main combustion chamber at multiple locations through chemical, thermal and turbulent effects some distance away from the pre-chamber nozzle. The chemical effect is caused by radical species present in the jet which are highly reactive so as to be capable of igniting the air-fuel mixture present in the main chamber. Thermal effects are caused by partially or fully burned combustion products which enter the main chamber at an elevated temperature capable of triggering the main chamber combustion. The turbulent effect ensures interaction between the turbulent jets and the charge in the main chamber.

A prior art internal combustion engine having such an ignition system arranged therein is shown in US 2012 103 302 A1. The internal combustion engine has an engine block with one or more cylinders. Each cylinder has a cylinder head bordering a main combustion chamber in which the main air fuel charge is ignited. A piston is arranged bordering the combustion chamber which is connected via a rod at a crankshaft so as to allow a reciprocal movement. Each cylinder head defines an intake opening and an exhaust opening. The intake and exhaust openings are opened and closed via cam driven valves to provide fluid communication between the cylinder and an intake manifold and an exhaust manifold. The internal combustion engine also includes a fuel injector mounted in the intake manifold as a means of introducing the main fuel/air charge into the combustion chamber through the intake port. The ignition device has an igniter portion and an injector arranged to face an inner pre-chamber volume.

The pre-chamber is shaped so as to form a nozzle having a plurality of orifices disposed spaced from one another and providing fluid communication between the pre-chamber and the combustion chamber. The igniter portion ignites the fuel in the pre-chamber. The orifice diameter is kept small to promote flame quenching as the combustion products exit out of the pre-chamber into the main combustion chamber. Flame quenching means that the partially combusted pre-chamber products are forced through the small orifices of the pre-chamber. The combustion products are extinguished but dispersed through the main combustion chamber then react with the main fuel charge and initiates combustion in the main fuel chamber at multiple locations through chemical, thermal and turbulent effects some distance away from the pre-chamber nozzle.

An improved ignition device capable of creating a reactive jet is disclosed in US 2015 006 848 9 A1. The pre-chamber of the ignition device includes a plurality of orifices to provide a fluid communication between the pre-chamber volume and the main chamber volume. To ensure a deep penetration of the turbulent jet into the main chamber, the orifices are limited to a range of specific maximum and minimum diameters while the pre-chamber volume is kept in a specific range.

This design is chosen only for a proper targeting of nozzle characteristics such as orifice diameter, number of orifices in relation to pre-chamber volume. The disadvantage related to known designs is that it only relates to physical jet properties such as velocity, penetration and ignition site distribution to a range of pre-chamber volumes. There is a need to specify a relation between pre-chamber and nozzle geometric features and the size of the engine cylinder as described by cylinder bore size.

Hence it is an object of the invention to provide an internal combustion engine with improved thermal efficiency and which takes into account the design (i.e. size) of the main combustion chamber and in particular the design (i.e. size) of the orifices in relation to the diameter of the engine bore.

This object is achieved by an internal combustion engine according to the independent claim. Specific aspects of the invention form the subject matter of the respective dependent claims.

The present invention comprises an internal combustion engine having at least one cylinder and a piston supported for repeated reciprocal movement in the cylinder so as to define a combustion chamber of an engine bore diameter (A-A). The internal combustion engine further comprises an ignition device arranged in said cylinder (the ignition device) having an igniter portion and an fuel injector which are both arranged in a pre-chamber, wherein the pre-chamber comprises a plurality of orifices for providing fluid communication between said pre-chamber and the combustion chamber. The plurality of orifices are of an overall orifice area so that the ratio between the overall orifice area and the engine bore diameter (A-A) ranges from 0.01 mm to 0.2 mm.

Since the ratio between the overall orifice area size and the engine bore diameter ranges from 0.01 mm to 0.2 mm, a maximum in net thermal efficiency is achieved. This relation enables scalability of the pre-chamber and nozzle to a range of engine sizes. Net thermal efficiency is defined as the engine work divided by the fuel energy, wherein the engine work is combustion work and the pumping work, and wherein the fuel energy is the fuel flow multiplied by the fuel heating value. Hence, a specific orifice area and engine bore size ration achieves a maximum in the net thermal efficiency.

That is unexpected in view of prior art publications which state that peak net thermal efficiency is maximized with decreasing nozzle orifice area. Technically for a given engine bore size, a large orifice area decreases the net thermal efficiency because of low jet velocities and a small orifice area decreases the net thermal efficiency because of a choked flow which lowers the temperature of the jet thereby reducing the thermal effect necessary for ignition. The overall orifice area size in the pre-chamber nozzle is the sum of the areas of each individual nozzle orifice ($A=\pi r^2$ for circular shaped orifices). The engine bore diameter is in other words the bore of the engine or the diameter of the cylinder.

According to a specific aspect, the ratio between the overall orifice area size and the engine bore diameter ranges from 0.016 mm to 0.16 mm (i.e. from 0.05 mm to 0.09 mm). In a particularly preferred ratio between the overall orifice area size and the engine bore diameter is 0.06 mm. These ranges represent the optimum results in experimental measurements which have shown a maximum in net thermal efficiency.

Another preferred aspect relates to that the number of orifices is in the range of 4 to 8, and wherein diameter of the orifice is in the range of 0.7 mm to 1.55 mm. The given values are particularly of interest in combination with a combustion engine having an engine bore diameter (A-A) of 87.5 mm.

Advantageously, each orifice has a first surface area facing the pre-chamber and a second surface area facing the combustion chamber, and wherein the ratio of the size of the first surface area and the size of the second surface area is in the range of 0.5 to 2. Varying the ratio allows for changing the form of the jet emanating from the orifice, i.e. a reduction results in a convergent jet, while an increase in surface area results in a divergent jet.

It is moreover preferred if the inner volume of the pre-chamber is less than 5% and in particular the range of 0.3% to 3% of the minimum volume of the combustion chamber. Measurements have shown that larger pre-chamber volumes than this result in a decrease in net thermal efficiency.

Another preferred aspect relates to that such an orifice is arranged in the pre-chamber so that the centerline of the orifice (C-C) has an angle in the range of 50° to 60° relative to the central axis of the pre-chamber (B-B). It is further preferred to arrange the orifices in multiple parallel planes (e.g. a first number of orifices (e.g. three in a six orifice nozzle) in a first plane and second number of orifices (e.g. three) in a second plane having a respective angle between orifice centerline and central axis of the pre-chamber of 50° and 60°. These angles provide a good combustion efficiency. Changing the angle from 50° to 60° has shown to allow for increasing the lean limit from 1.7λ to 2.1λ.

Preferably, the fuel injector is arranged in the pre-chamber so that the centerline of the fuel spray (D-D) has an angle in the range of 20° to 60° relative to the central axis of the pre-chamber (B-B). This allows for a good mixing of air and fuel in the pre-chamber, i.e. the fuel spray interacts with air charge entering the pre-chamber via the orifices. Fuel spray centerline angles less than 20° will result in fuel directly impacting the spark plug, thereby impeding ignition. Fuel spray centerline angles greater than 60° will result in fuel directly impacting the orifices and exiting through those orifices, thereby exiting the pre-chamber prior to ignition.

According to an advantageous aspect, the ignition device comprises a control unit capable of that the fuel injector injects fuel spray pulses into the pre-chamber in a manner so that a rich fuel mixture is present near the walls of the pre-chamber and a rich mixture is present in the area near the spark plug electrode. This ensures that ignition occurs in the pre-chamber as induced by the spark plug and that the combustion flame front emanating from the spark plug is forced to travel near the pre-chamber wall as it proceeds towards the orifices and then out through the orifices as jets. Flame travel near the pre-chamber wall is preferred to avoid the incoming air charge into the pre-chamber, thereby maximizing flame velocity and maximizing jet velocity.

According to another aspect of the invention, the ignition device comprises a control unit capable of that the fuel injector is capable of injecting fuel spray pulses into the pre-chamber in a manner so that in between of consecutive fuel spray pulses at least two sparks are provided by the igniter portion. The further ignition spark allows for more complete combustion of the contents in the pre-chamber, thereby increasing the quantity of energy released in the pre-chamber during the pre-chamber combustion event and increasing jet velocity.

FIG. 1 depicts an internal combustion engine 1 comprising one cylinder 2 (of e.g. four). The cylinder 2 is formed in an engine block 21 and a cylinder head 22 is arranged thereon. An inlet 221 with a separate main fuel injector 5 and an outlet 222 for discharging the combusted products are arranged in cylinder head 21. A piston 3 is supported (at a crank shaft—not shown below) for repeated reciprocal movement in the cylinder 2 so as to define (together with the cylinder head) a combustion chamber 21 having an engine bore diameter (A-A) which is in the shown example 87.5 mm.

Internal combustion engine 1 further comprises an ignition device 4 (for turbulent jet ignition) arranged in said cylinder 2 having an igniter portion 42 and an fuel injector 43 (separate from the main fuel injector) which are both arranged facing a pre-chamber 41. Pre-chamber 41 comprises in the shown example six orifices 44 for providing fluid communication from inside of pre-chamber 41 to combustion chamber 21. The orifices 44 are of an overall orifice area (aggregate area of all individual orifice areas) of 5.70 mm² so that the ratio between the overall orifice area and an engine bore diameter (A-A) is 0.065 mm. The overall orifice area size in the pre-chamber 44 is the number of six orifices multiplied by the individual orifice area of 5.70 mm². The engine bore diameter is in the present example 87.5 mm. The achieved net thermal efficiency is 42.1%. That maximum in net thermal efficiency is unexpected in view of prior art publications which state that net thermal efficiency is maximized with decreasing nozzle orifice area. Net thermal efficiency is calculated as engine work divided by fuel energy, wherein the engine work is combustion work and the pumping work, and wherein the fuel energy is the fuel flow multiplied by the fuel heating value. The dimensions provide an orifice area small enough to avoid low jet velocities and which is large enough to avoid a choked flow and, therewith, reduced temperatures of the jet. The overall orifice area size in the pre-chamber is the number of orifices 44 multiplied by the respective area (A=πr² for circular shaped orifices).

To achieve optimal (complete) ignition and subsequent flame travel in the pre-chamber 41, the ignition device 4 comprises in the present example a control unit (not depicted) capable of controlling the fuel injector 43 so as to injecting multiple fuel spray pulses into the pre-chamber 41 in a given cycle so that a rich mixture exists near the igniter portion 42 and a rich mixture exists near the pre-chamber walls.

In an alternative mode of operation, the ignition device 4 comprises a control unit (not depicted) capable of controlling the fuel injector 43 so that it injects fuel spray pulses into the pre-chamber 41 in a manner so that more than one fuel spray pulse is injected in between of consecutive sparks provided by the igniter portion 42.

Figure 2:
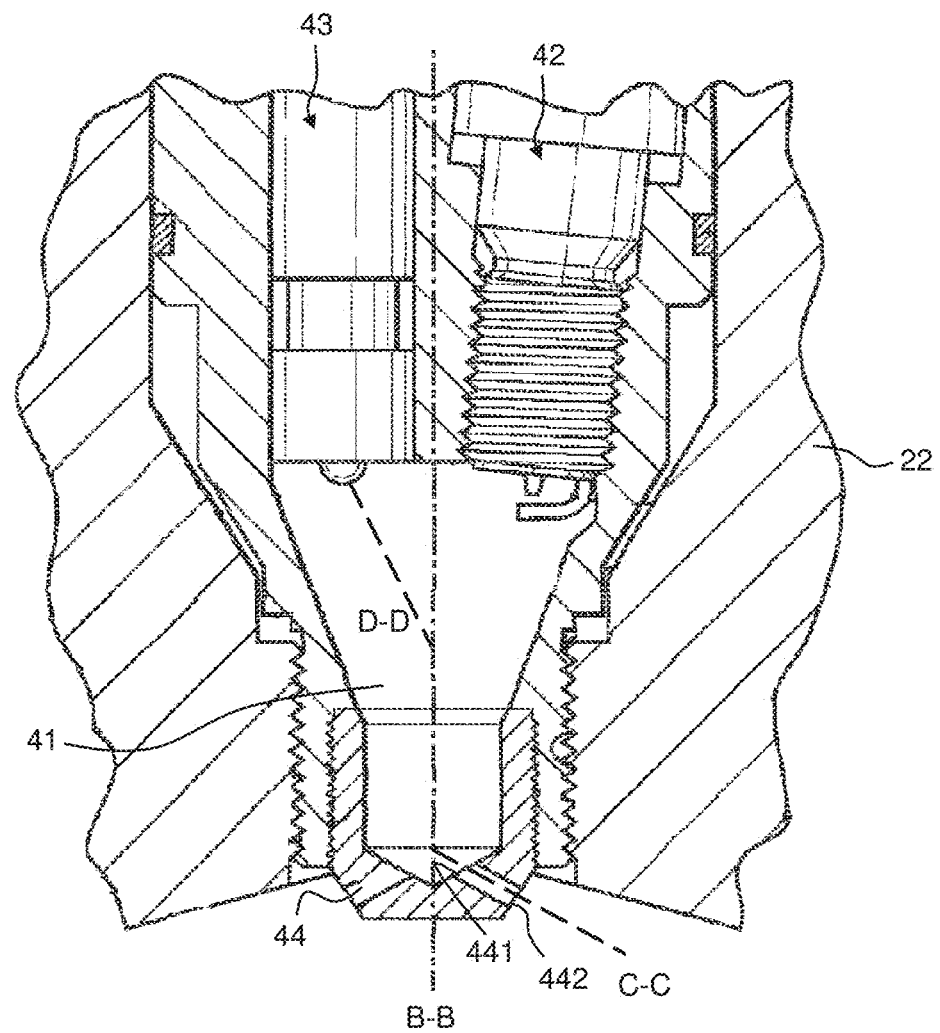
FIG. 2 is a vertical sectional view of the ignition device of FIG. 1.

A more detailed view of the pre-chamber design is given in FIG. 2, wherein pre-chamber 41 is arranged on top of a combustion chamber (main chamber) in the cylinder head 22 of an internal combustion engine. The pre-chamber 41 comprises a number of orifices 44, wherein each orifice 44 has a first (inner) surface area 441 facing the pre-chamber 41 and a second (outer) surface area 442 facing the combustion chamber. The ratio of the size of the first surface area 441 and the size of the second surface area 442 is in the shown example 1 which means that both areas are of the same size. Since the ratio correlates to the form of the emanating jet, the jet in this example (ration 1) is (ideally) parallel.

Each orifice 44 is arranged in the pre-chamber 41 so that the centerline of the orifice C-C has an angle of 60° (lower angle between B-B and C-C) relative to the central axis of the pre-chamber B-B. The fuel injector 43 is arranged in the pre-chamber 41 and is designed so that the centerline of the fuel spray D-D has an angle (upper angle between B-B and D-D) of 20° relative to the central axis of the pre-chamber B-B.

Figure 3:
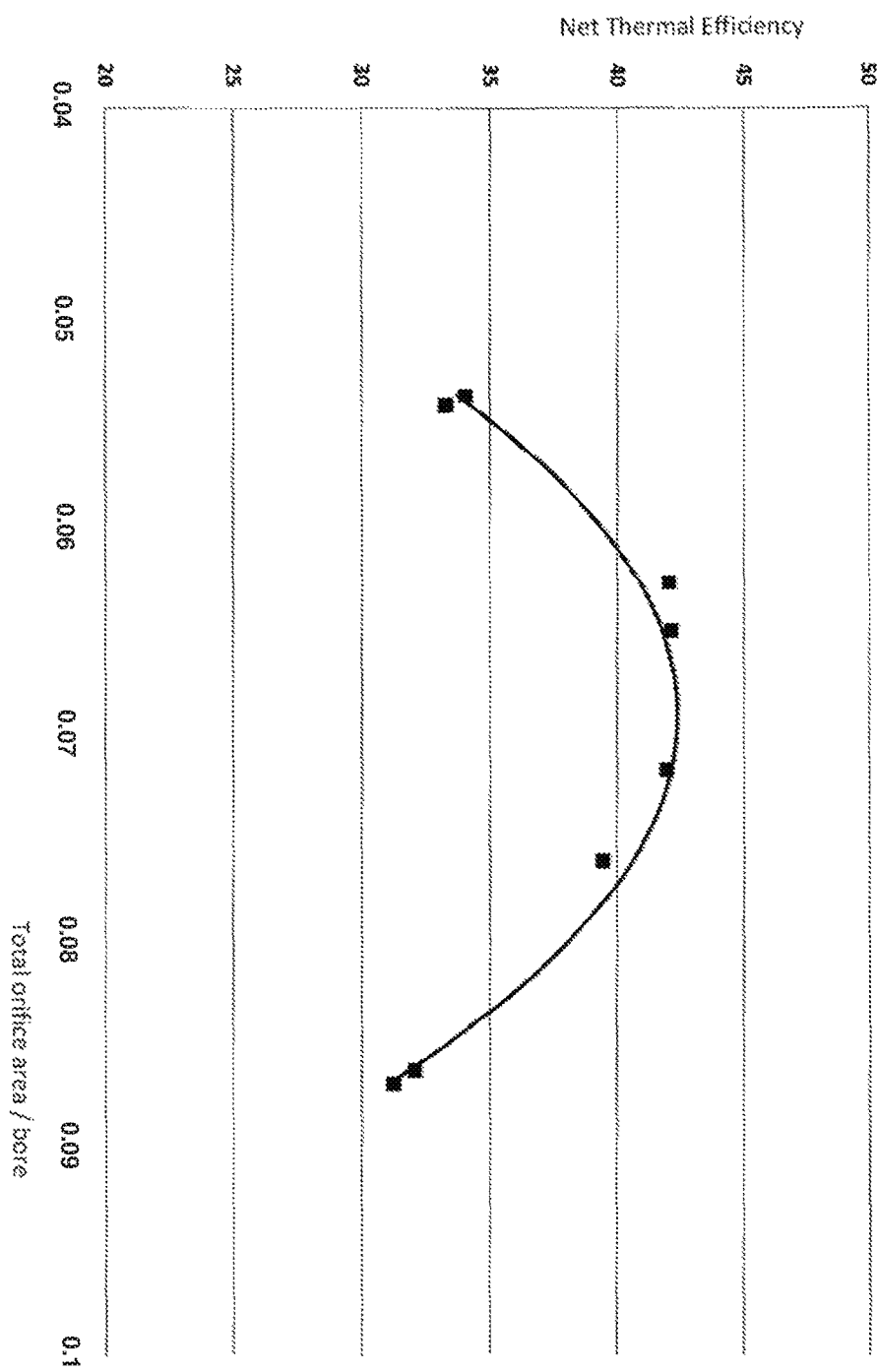
FIG. 3 is a graph representing the net thermal efficiency vs. the ratio of the overall orifice area over the engine bore diameter.

FIG. 3 provides a graph for a measurement of the net thermal efficiency against the ratio of the overall orifice for the examples of specific dimensions provided as table in the following.

| Number of orifices | Orifice outer diameter (mm) | Orifice area (mm2) | Orifice area: bore | Net thermal efficiency (%) |
|---|---|---|---|---|
| 4 | 1.55 | 7.54767635 | 0.086259158 | 32 |
| 5 | 1.1 | 4.751658889 | 0.054304673 | 33.2 |
| 6 | 1 | 4.71238898 | 0.053855874 | 34 |
| 6 | 1.1 | 5.701990666 | 0.065165608 | 42.1 |
| 7 | 1 | 5.497787144 | 0.062831853 | 42 |
| 8 | 1 | 6.283185307 | 0.071807832 | 41.9 |
| 8 | 1.1 | 7.602654222 | 0.086887477 | 31.2 |
| 8 | 1.03 | 6.665831292 | 0.076180929 | 39.4 |

The calculation includes both equations:

$$\text{Orifice area: engine bore size} = \frac{\left[\pi \cdot \left(\frac{\text{orifice diameter}}{2}\right)^2\right] * \text{number of orifices}}{\text{engine bore}}$$

$$\text{Net Thermal Efficiency} = \frac{\text{Engine Work}}{\text{Fuel Energy}} = \frac{\text{Work}(\text{combustion work} + \text{pumping work})}{\text{Fuel flow} * \text{Fuel heating valve}}$$

The maximum in net thermal efficiency is in view of prior art which state that net thermal efficiency is maximized with decreasing nozzle orifice area not to be expected.

Figure 4:
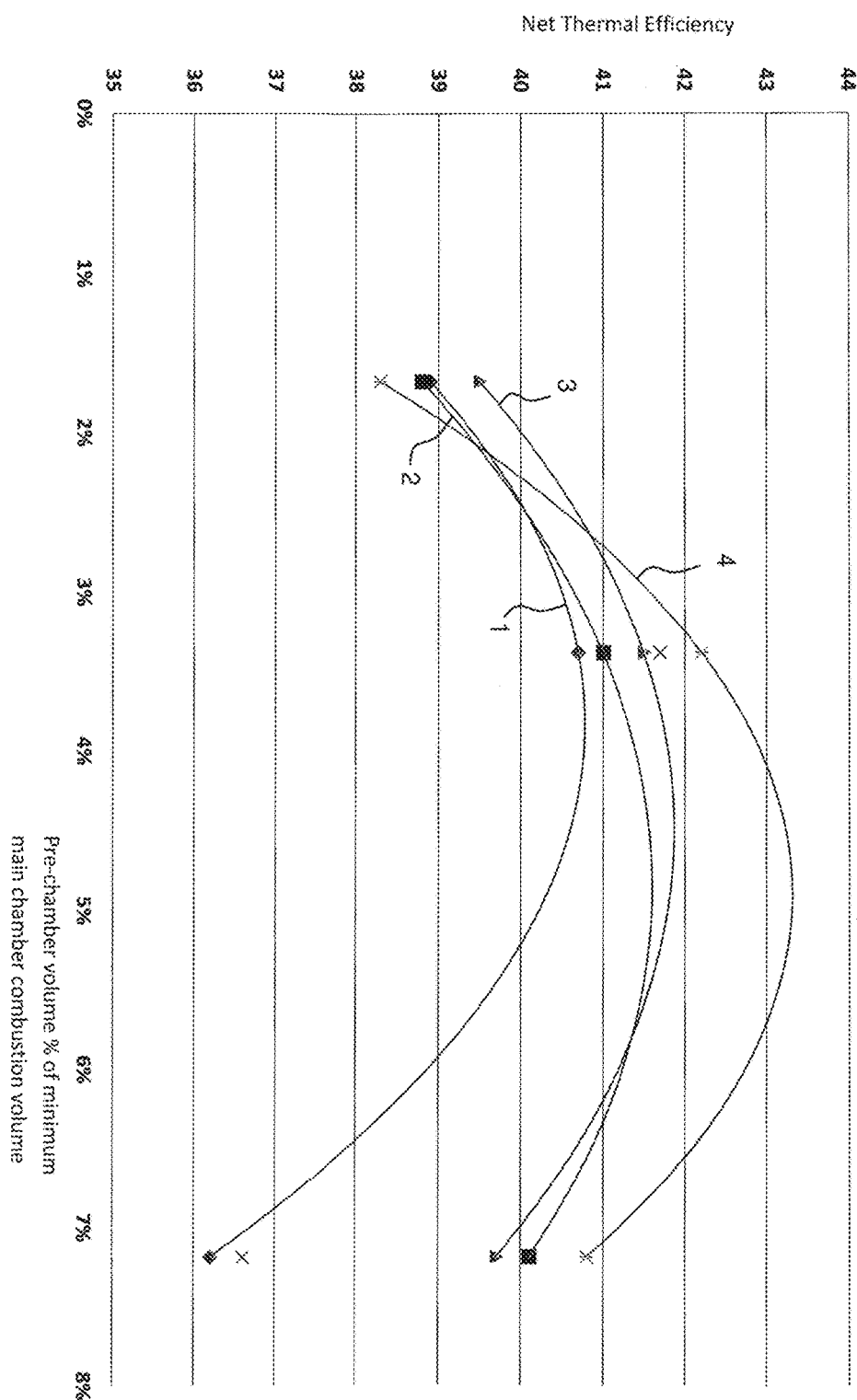
FIG. 4 is a graph representing the net thermal efficiency vs. the pre-chamber volume.

FIG. 4 is a graphical representation of inner volume of the pre-chamber against the net thermal efficiency, wherein the pre-chamber volume of less than 5% and in particular the range of 0.3% to 3% of the minimum volume of the combustion chamber Minimum volume is for the piston arranged in the upper top dead position. Measurements for larger pre-chamber volumes result in a decrease in net thermal efficiency. The shown measurements represent net thermal efficiency against pre-chamber volume in % of minimum main chamber combustion volume, wherein graph 1 is for 1500 rpm/3.9 bar1 MPEg/L2, graph 2 is for 1500 rpm/3.9 bar1 MPEg/L1.9, graph 3 is for 1500 rpm/3.9 bar1 MPEg/L1.8 and graph 4 is for 4000 rpm/7.87 bar1 MPEg/L1.5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An internal combustion engine comprising at least one cylinder and a piston supported for repeated reciprocal movement in the cylinder so as to define a combustion chamber of an engine bore diameter (A-A), the internal combustion engine further comprising an ignition device arranged in the cylinder having an igniter portion and a fuel injector which are both arranged in a pre-chamber, wherein the pre-chamber comprises a plurality of orifices for providing fluid communication between the pre-chamber and the combustion chamber, and wherein the plurality of orifices are of an overall orifice area so that a ratio between the overall orifice area and the engine bore diameter (A-A) ranges from 0.01 mm to 0.2 mm.

2. The internal combustion engine according to claim 1, wherein the ratio between the overall orifice area and the engine bore diameter (A-A) ranges from 0.016 mm to 0.16 mm.

3. The internal combustion engine according to claim 1, wherein the ratio between the overall orifice area and the engine bore diameter (A-A) is 0.06 mm.

4. The internal combustion engine according to claim 1, wherein the number of orifices is in the range of 4 to 8, and wherein diameter of the orifice is in the range of 1 mm to 1.55 mm.

5. The internal combustion engine according to claim 1, wherein each orifice has a first surface area facing the pre-chamber and a second surface area facing the combustion chamber, and wherein the ratio of the size of the first surface area and the size of the second surface area is in the range of 0.5 to 2.

6. The internal combustion engine according to claim 1, wherein an inner volume of the pre-chamber is less than 4% of the minimum volume of the combustion chamber.

7. The internal combustion engine according to claim 1, wherein the plurality of orifices is arranged in the pre-chamber so that a centerline of the orifice (C-C) has an angle in the range of 50° to 60° relative to a central axis of the pre-chamber (B-B).

8. The internal combustion engine according to claim 1, wherein the fuel injector is arranged in the pre-chamber so that a centerline of the fuel spray (D-D) has an angle in the range of 20° to 60° relative to a central axis of the pre-chamber (B-B).

9. The internal combustion engine according to claim 1, wherein the ignition device comprises a control unit capable of controlling the fuel injector to inject a fuel spray pulses into the pre-chamber in a manner so that more than one fuel spray pulse is injected during a single cycle, providing optimal air-fuel mixture near the igniter portion and near the walls of the pre-chamber.

10. The internal combustion engine according to claim 1, wherein the ignition device comprises a control unit capable of controlling the fuel injector to inject fuel spray pulses into the pre-chamber in a manner so that in between of consecutive fuel spray pulses at least two sparks are provided by the igniter portion.

11. The internal combustion engine according to claim 1, wherein the number of orifices is in the range of 4 to 8, and wherein diameter of the orifice is 1.55 mm.

* * * * *